Figure 1:
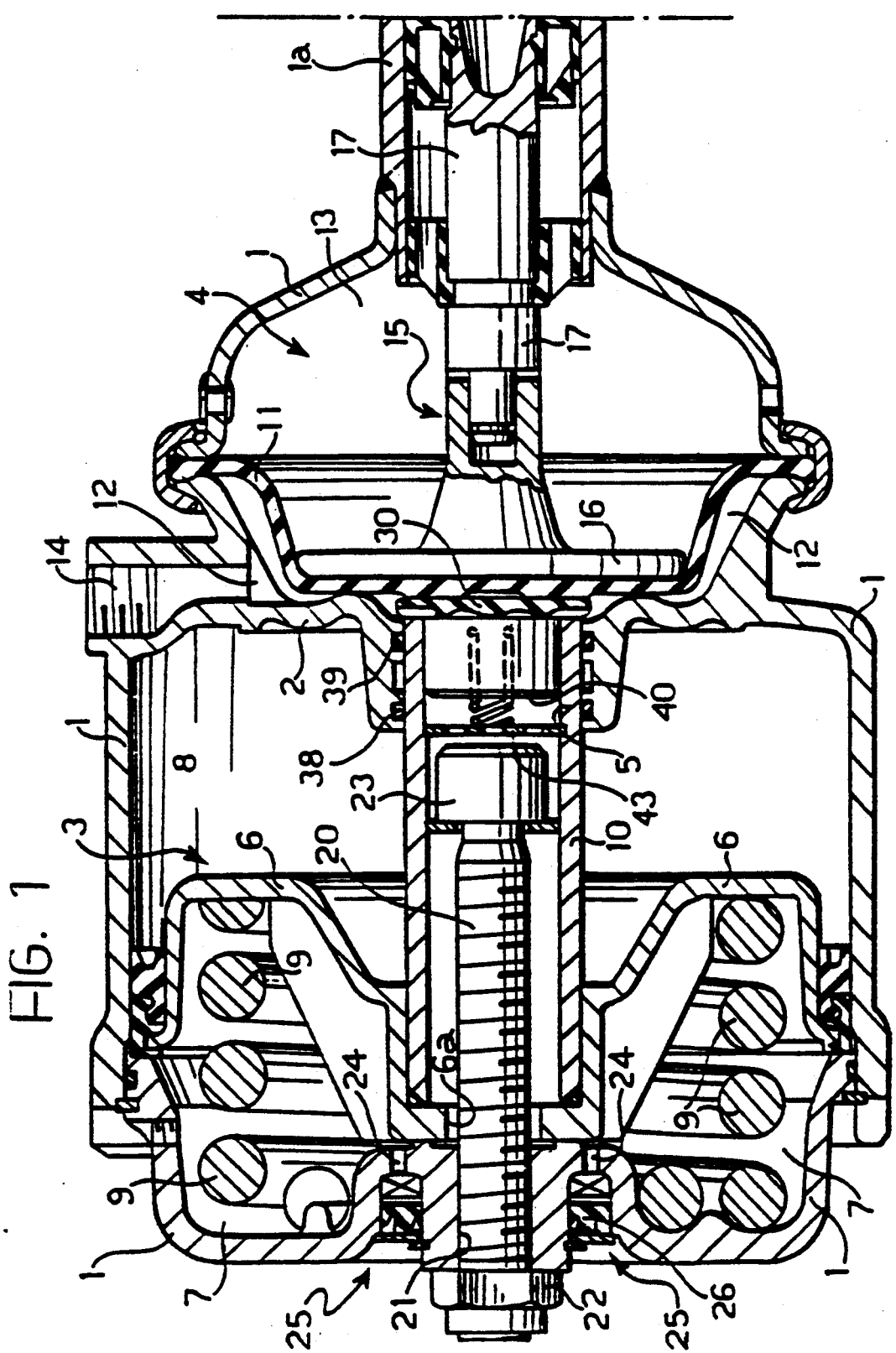

United States Patent [19]

Rapa

[11] Patent Number: 5,215,170
[45] Date of Patent: Jun. 1, 1993

[54] DUAL BRAKING UNIT FOR PNEUMATIC BRAKING SYSTEMS

[75] Inventor: Antonio Rapa, Monza, Italy

[73] Assignee: Bendix Heavy Vehicle Systems Italia S.p.A., Milan, Italy

[21] Appl. No.: 859,197

[22] Filed: Mar. 27, 1992

[30] Foreign Application Priority Data

Dec. 13, 1990 [IT] Italy ............... 68003 A/90

[51] Int. Cl.$^5$ .................................... F16D 65/24
[52] U.S. Cl. .................................. 188/170; 303/6.01
[58] Field of Search ............. 188/170, 153 D, 153 R, 188/154; 303/6.01, 9.61, 9.76

[56] References Cited

U.S. PATENT DOCUMENTS

| | | | |
|---|---|---|---|
| 2,642,962 | 6/1953 | Whaley | 303/6.01 X |
| 3,516,525 | 6/1970 | Skaggs | 188/170 X |
| 3,837,443 | 9/1974 | Clemmons et al. | 188/153 R X |
| 3,926,094 | 12/1975 | Kurichh et al. | 188/170 X |
| 4,072,360 | 2/1978 | Carroll et al. | 188/170 X |
| 4,777,867 | 10/1988 | Severinsson et al. | 188/170 X |

FOREIGN PATENT DOCUMENTS

| | | | |
|---|---|---|---|
| 0712430 | 6/1965 | Canada | 188/170 |
| 3315575 | 10/1984 | Fed. Rep. of Germany | 188/170 |
| 3932524 | 4/1991 | Fed. Rep. of Germany | 188/170 |

Primary Examiner—Matthew C. Graham
Assistant Examiner—Peter M. Poon
Attorney, Agent, or Firm—Ken C. Decker; William N. Antonis

[57] ABSTRACT

The dual braking unit includes a cylinder with a diaphragm 4, 11-17) for controlling the service braking and a cylinder with a drive spring (3, 6-10) for controlling the parking and emergency braking. The cylinder with the spring includes a piston (6, 10) with an operating tube or tubular push rod (10) which extends sealingly through a hole (5) in a wall (2) separating the operating chambers (8; 12) of the cylinders. There is a pair of holes (35, 36; 35, 34) in the tube (10) for enabling communication between the chamber (7) with the spring (9) and the operating chamber (12) of the cylinder with the diaphragm when only the parking and emergency brake is applied. A cut-off valve device (40-43) is associated with the holes (35, 36; 34. 35) for preventing air from flowing from the operating chamber (12) of the cylinder with the diaphragm to the chamber (7) with the spring (9) when the service brakes are applied while the parking and emergency brake is applied.

8 Claims, 5 Drawing Sheets

DUAL BRAKING UNIT FOR PNEUMATIC BRAKING SYSTEMS

The present invention relates to braking units for pneumatic braking systems for motor vehicles.

More specifically, the subject of the invention is a dual braking unit including, in series:

a cylinder with a diaphragm for controlling the service braking, including an operating chamber and an exhaust chamber separated from each other by the diaphragm, and a cylinder with a drive spring for controlling the parking and emergency braking, including a chamber for the spring and an operating chamber separated by a piston with a tubular, operating push rod which extends sealingly through a hole in a wall separating the operating chambers of the cylinders and cooperates with the diaphragm of the cylinder for controlling the service braking, the end portion of the push rod which faces the diaphragm having a closure element.

The dual braking unit according to the invention is characterized in that there is at least one pair of axially offset holes in the end portion of the push rod for enabling communication between the spring chamber of the cylinder with the spring and the operating chamber of the cylinder with the diaphragm when the parking and emergency brake is applied; cut-off valve means controlled by the pressure in the operating chamber of the cylinder with the diaphragm being associated with the holes for preventing air from flowing from the operating chamber of the cylinder with the diaphragm to the spring chamber of the cylinder with the spring when the service brakes are applied while the parking and emergency brake is applied.

The dual braking unit according to the invention thus prevents the loss of pressure and hence, in short, a wastage of energy when the service brakes are applied while the parking and emergency brake is applied. This condition may occur, for example, when the motor vehicle has to be started again after it has stopped on an ascending or descending slope. In these circumstances, the driver may instinctively apply the service brakes by operating the brake pedal before he releases the parking brake, to prevent the vehicle from moving as soon as the parking brake is released.

Figure 2:
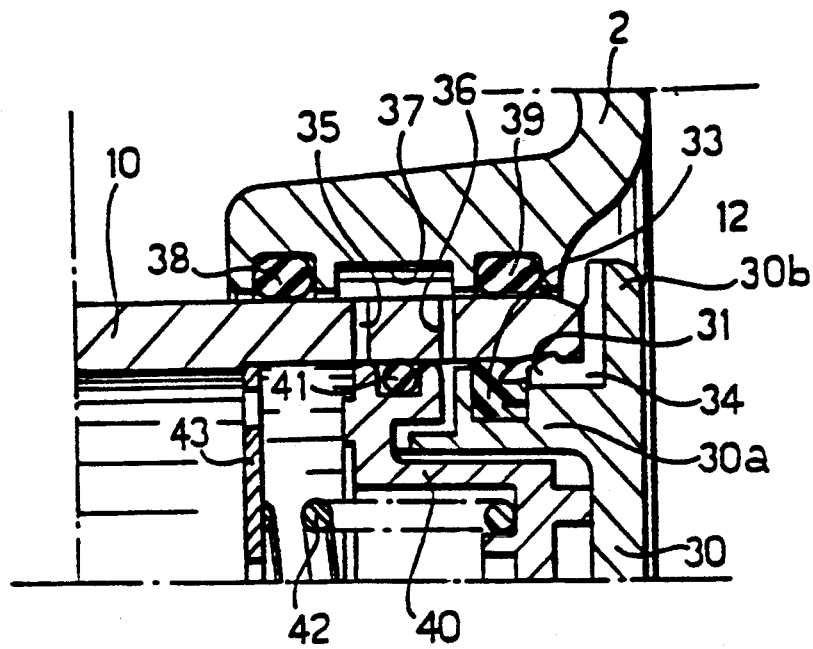
Figure 3:
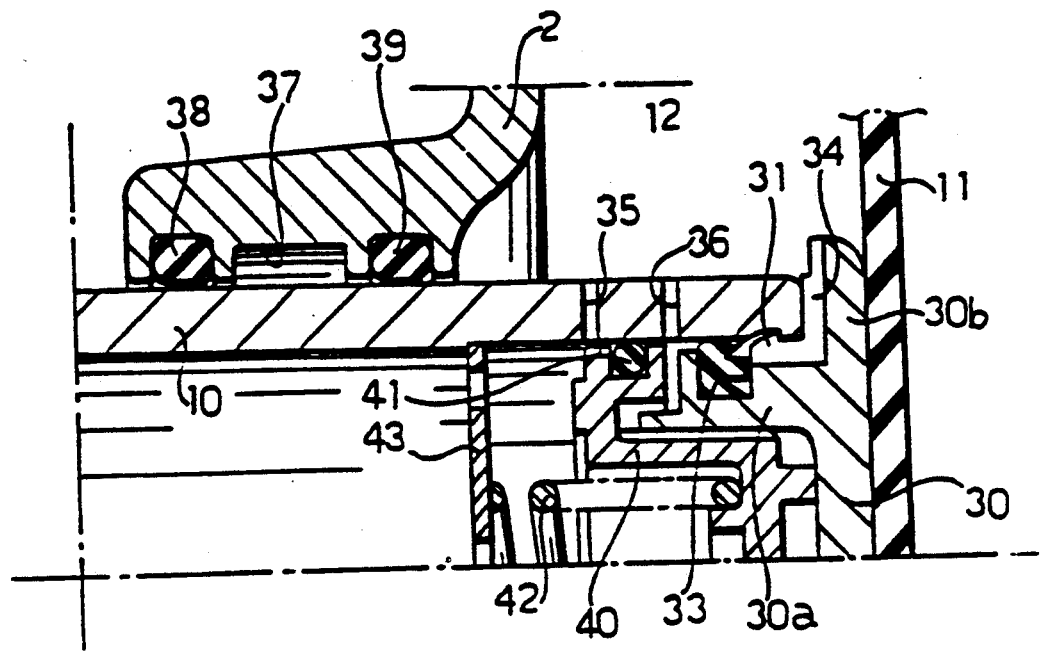
Figure 4:
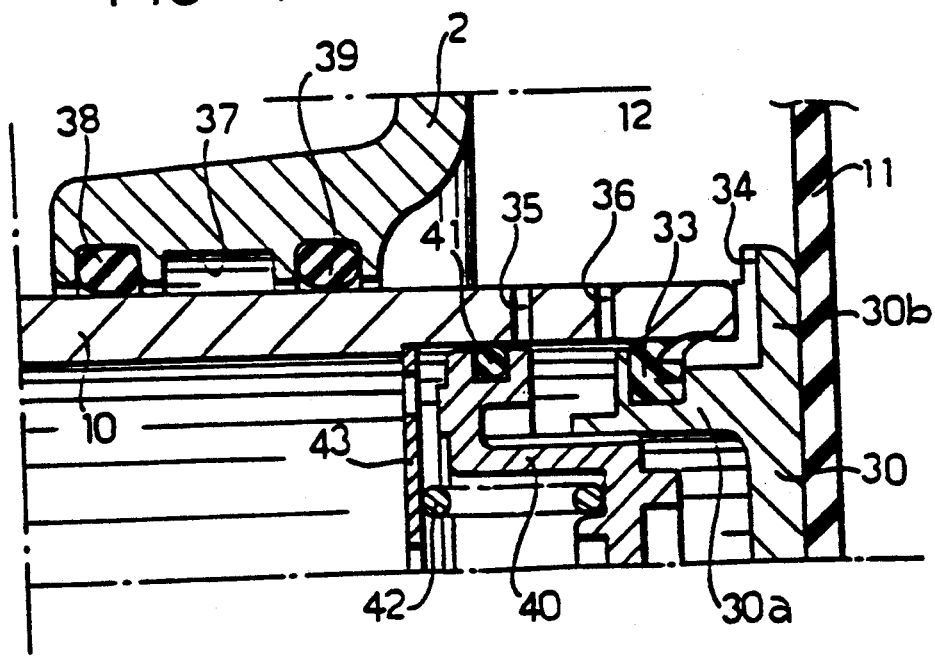

Further characteristics and advantages of the invention will become clear from the detailed description which follows, with reference to the appended drawings, provided purely by way of non-limiting example, in which:

FIG. 1 is an axially sectioned view of a dual braking unit according to the invention, FIG. 2 is a partial view showing a detail of FIG. 1 on an enlarged scale, FIGS. 3 and 4 are views similar to FIG. 2 relating to two different operating conditions of the braking unit, and FIGS. 5, 6, 7 and 8 are views similar to FIG. 2 relating to four different variants.

With reference to the drawings and, in particular, to FIG. 1, a dual braking unit according to the invention includes a rigid casing formed by several interconnected parts, generally indicated 1. The interior of the casing 1 is divided into two regions 3 and 4 by a rigid transverse wall 2 with a central hole 5.

A piston 6 is sealingly slidable in the region 3 and divides that region into two chambers 7 and 8. A spring 9 is housed in the chamber 7 and biases the piston 6 towards the wall 2.

The chamber 8 is intended to be connected to a compressed-air supply (by means of a connector, not visible in the drawing) so that the piston 6 is normally kept in the position shown, in which it compresses the drive spring 9.

The piston 6 carries a central, tubular push rod 10 which extends into the chamber 8 and sealingly through the hole 5 in the wall 2.

The periphery of a resilient diaphragm 11 is fixed in the region 4 and divides that region into two regions or chambers 12 and 13.

The chamber 12 is intended to be connected to a brake-operating valve (not shown) by means of a connector 14.

A brake-operating member 15 is mounted in the chamber 13 and has a head 16 in contact with the diaphragm 11 and a central rod 17 which is slidable in a tubular output portion 1a of the casing 1.

The dual braking unit shown in FIG. 1 includes, in known manner, a device for the manual release of the parking brake which is usable in the event of a failure to maintain pressure in the chamber 8. This device includes a threaded rod 20 which engages a threaded hole 21 in the fixed end wall of the chamber 7 (the wall at the left-hand end in FIG. 1) and extends with clearance through a central hole 6a in the piston 6, projecting into the tube 10. A nut 22 is screwed onto the end of the rod 20 which projects from the casing 1. When it is necessary to release the parking brake manually, the nut 22 is rotated, causing the rod 20 to rotate and move towards the left, as seen in FIG. 1, so that the end head 23 of the rod entrains the piston 6 and reloads the drive spring 9.

In the embodiment shown in FIG. 1, the left-hand end wall of the casing 1 has a plurality of vent holes, indicated 24, around the threaded hole 21. These holes are formed in the end wall of an annular recess 25 in the end wall of the casing, a lipped sealing ring 26 being disposed in the recess. The sealing ring is shaped so as to enable air to pass only from the chamber 7 with the drive spring towards the region outside the casing 1 but to prevent water, dust, mud, etc. from entering the chamber.

In the embodiment illustrated in FIGS. 1 to 4, the end of the push rod or tube 10 which faces the diaphragm 11 has an end closure element 30. This element is constituted by a plug snap-engaged in the end of the push rod and having a tubular portion 30a with hooked projections 31 which snap-engage in a corresponding annular groove in the inner wall of the tube 10. The plug 30 can rotate freely relative to the tube 10.

In the embodiment of FIGS. 1 to 4 the tubular portion 30a of the plug 30 has an external peripheral groove housing an annular sealing element 33 in the form of a lipped sealing ring which effects a seal against the internal surface of the tube 10.

The plug 30 has a head portion 30b whose radially outermost portion faces the end edge of the tube 10. At least one groove 34 extends partly radially and partly axially from the side of the radially outermost portion of the head 30b of the plug 30 which faces the edge of the tube. This groove constitutes a duct through which the lipped sealing ring 33 is exposed to the pressure prevailing at any time in the operating chamber 12 of the cylinder with the diaphragm. In particular, the sealing ring is formed in such a way as to prevent the leakage of compressed air into the tube 10 when the chamber 12 is pressurised. The sealing ring can, however, enable air to pass in one direction from the interior of the tube 10 to the chamber 12 through the duct 34 defined in the plug 30 when the pressure in the interior of the tube 10 exceeds the pressure prevailing in the chamber 12 by a predetermined amount.

At least one pair of holes 35, 36 is formed adjacent the plug 30 in the wall of the tube or push rod 10. With reference to FIGS. 2 to 4, both the holes 35 and 36 are axially to the left of the portion of the wall of the tube 10 against which the sealing ring 33 carried by the plug 30 bears. Moreover, the positions of the holes 35 and 36 are such that in the condition of FIG. 1 (when the parking brake and the service brakes are released) they face an annular groove 37 defined in the central hole in the separating wall 2 between two sealing rings indicated 38 and 39 (see FIG. 2).

In FIGS. 1 to 4, a piston, indicated 40, carrying an external sealing ring 41 is sealingly slidable in the end portion of the tube 10 with which the end plug 30 is coupled. As can be seen better in FIGS. 2 to 4, a helical spring 42 associated with the piston 40 reacts against a perforated transverse wall 43 carried by the tube 10 and urges the piston 40 towards the position shown in FIGS. 2 and 3. In this position, the piston 40 abuts the closure 30 and its sealing ring 41 bears against the portion of the wall of the tube 10 between the holes 35 and 36.

In the embodiment of FIGS. 1 to 4, the dual braking unit according to the invention operates as follows.

When the braking unit is in the completely deactivated condition shown in FIG. 1, the chamber 12 is exhausted, while the chamber 8 is pressurised. The piston 6 is therefore in the position shown in FIG. 1 and the tube 10 is in the condition which can best be seen in FIG. 2.

If the parking and emergency brake is now applied, the chamber 8 is exhausted and the drive spring 9 thrusts the piston 6 towards the cylinder with the diaphragm. The tube 10 thrusts the diaphragm and the operating member 15 into the position in which the brakes are applied (FIG. 3). During this stage, the volume of the chamber 7 increases and its pressure starts to fall but, as soon as the hole passes the sealing ring 39, the air from the chamber 12 flows into the chamber 7 through the hole 35.

If the service brakes are also applied while the parking and emergency brake is applied, compressed air is supplied to the operating chamber 12 of the cylinder with the diaphragm. This air could escape through the hole 35 in the tube 10, the tube 10 itself, the hole 6a in the piston 6 and the spring chamber 7. This is promptly prevented, however, as a result of the movement of the piston 40 in the tube 10 caused by the air pressure which acts on its surface facing the plug 30 through the hole 36 in the tube. The piston 40 is thus moved as shown in FIG. 4 until its sealing ring 41 passes the hole 35. In this condition, the escape route for the compressed air from the chamber 12 is effectively cut off.

When the parking and emergency brake is released, pressure is once again supplied to the chamber 8 and the piston 6 returns gradually towards the position shown in FIG. 1, in which it compresses the spring 9. The tube 10 correspondingly returns gradually towards the position shown in FIGS. 1 and 2. During this movement, the hole 36 in the tube passes the sealing ring 39. When the service brakes are released, the chamber 12 is exhausted (through the connector 14) and the pressure acting on the piston 40 is then exhausted through the sealing ring 33. The spring 42 then returns the piston 40 into abutment with the plug 30.

During the release of the parking brake, the volume of the chamber 7 with the spring 9 decreases and the air therein can be vented through the holes 24 and the sealing element 26 which acts as a one-way valve. It should be noted, however, that in the embodiment of FIGS. 1 to 4, when the parking brake and the service brakes are released, the chamber 7 of the spring 9 could also be vented, even without the holes 24, through the hole 6a in the piston 6, the tube 10, the holes 35 and 36 in the tube, and the lipped sealing ring 33 carried by the plug 30. The air from the chamber 7 could thus be vented into the chamber 12 along this route.

Figure 5:
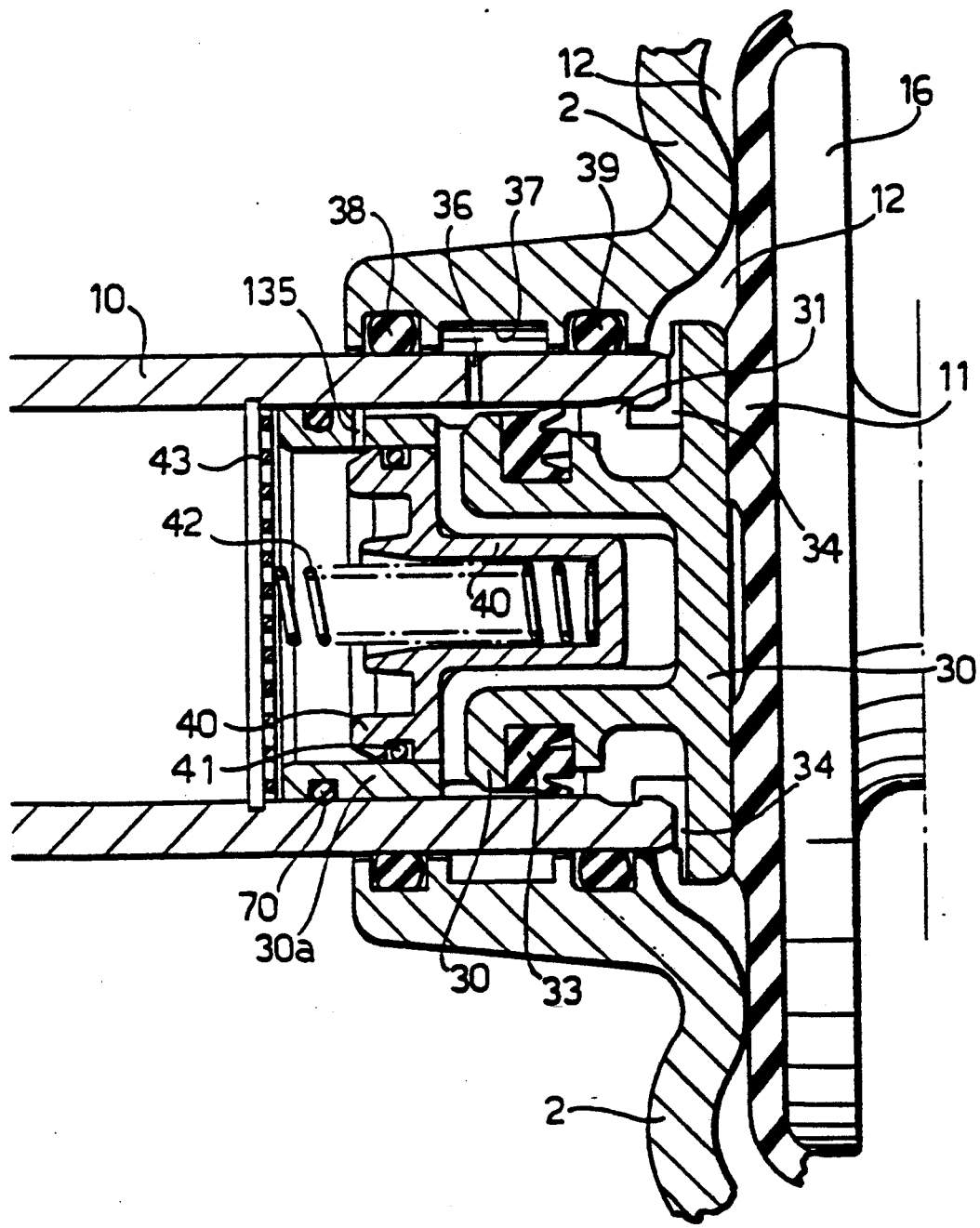

In FIG. 5 there is shown a variant in which the same reference numerals have been again assigned to parts and elements already described above. The variant of FIG. 5 differs from the embodiment of FIGS. 1-4 mainly in the following aspects. The plug 30 is longer and extends up to the perforated wall 43. Adjacent this wall a tubular appendix 30a of said plug carries an outside sealing ring 70 in contact with the internal surface of the tube 10. Between that sealing ring and the seat housing the lipped seal 30 in the tubular portion 30a of the plug 30 there is provided (at least) one hole 135, whose function substantially corresponds to that of hole 35 of the embodiment of FIGS. 1-4. The piston 40 in FIG. 5 is mounted sealingly slidable in the portion 30a of plug 30, and in the march condition (FIG. 5) it is disposed with its sealing ring 41 beyond the hole 135 and is urged towards and against the plug 30 by spring 42. In that condition the chamber 7 of the spring 9 communicates with the annular region through holes 135 and 36, but is prevented from communicating with the control chamber 12 by the sealing ring 39.

The operation of the variant shown in FIG. 5 is similar to that of the embodiment shown in FIGS. 1-4 and is not therefore further described.

Figure 6:
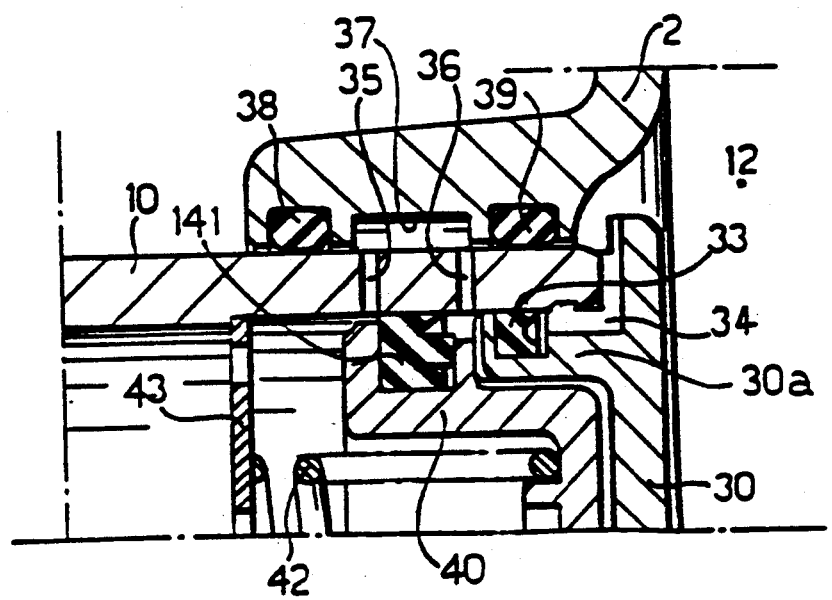

FIG. 6 shows another variant in which the same reference numerals have again been assigned to parts and elements already described above. The variant of FIG. 6 differs from the embodiment of FIG. 2 mainly in that, instead of a sealing ring 41 of circular cross-section, the piston 40 has a lipped sealing ring 141 which is adapted to prevent air from flowing from the chamber 12 into the tube 10 but to enable air to be vented from the chamber 7 to the chamber 12. The variant of the dual braking unit shown in FIG. 6 could also be formed without the vent holes 24 and the associated sealing ring 26.

Figure 7:
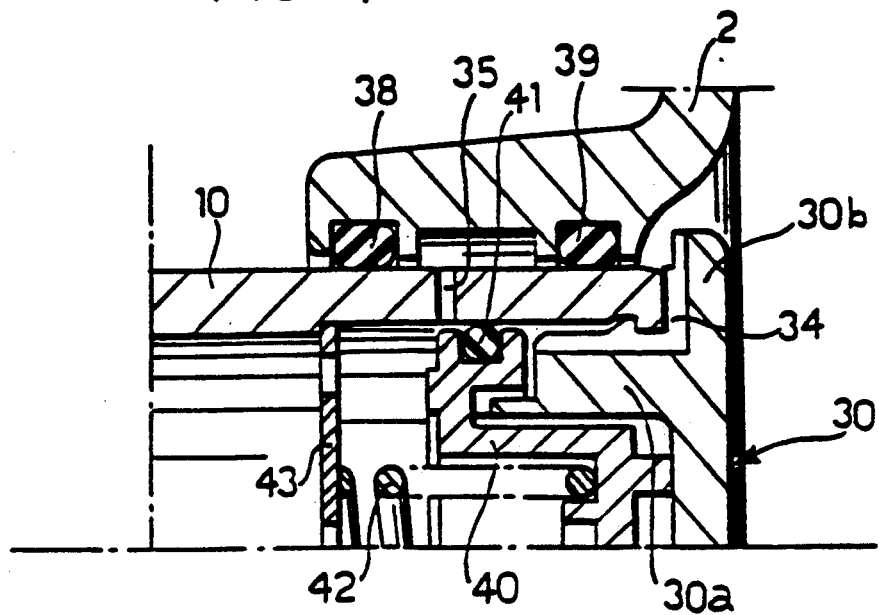

FIG. 7 shows a further variant which differs from that of FIG. 2 in that it does not have a hole 36 and in that the plug 30 lacks a lipped sealing ring 33. In this variant, the function of the hole 36 is performed by the ducts 34 in the plug 30. In this variant, however, it is not possible to do without the vent holes 24 and the associated sealing element 26 for venting the chamber 7 with the spring 9.

Figure 8:
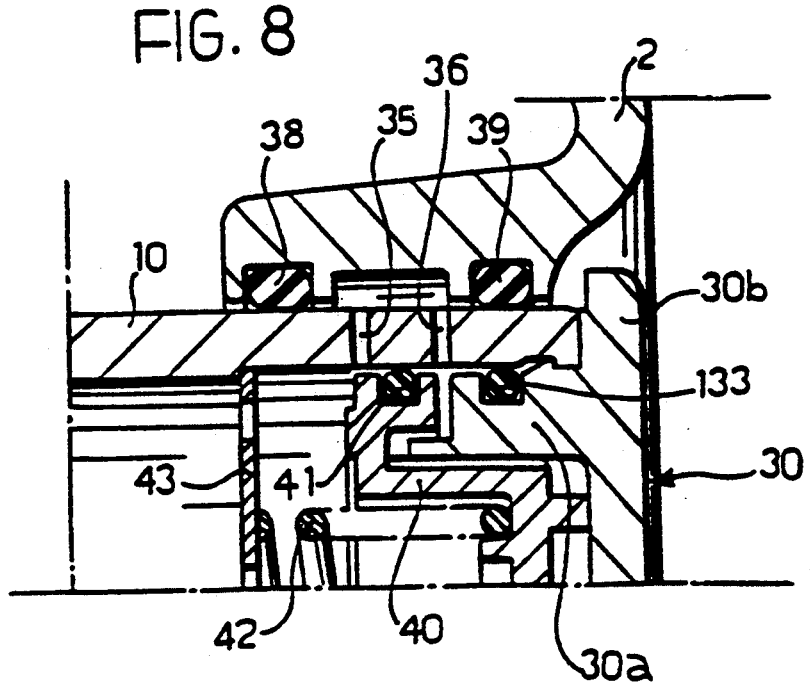

The variant according to FIG. 8 differs from that of FIG. 2 in that the plug 30 has no grooves 34 and, instead of a lipped sealing ring 33, has a sealing ring 133 of substantially circular cross-section. The variant of FIG. 8 operates in exactly the same way as the embodiment of FIGS. 1 to 4. The absence of the ducts 34 and the replacement of the lipped sealing ring 33 by the circular-sectioned ring 133 means that it is, however, necessary to provide one or more holes 24 with an associated one-way sealing element 26 for venting the chamber 7 with the drive spring 9.

Naturally, the principle of the invention remaining the same, the forms of embodiment and details of construction may be varied widely with respect to those described and illustrated purely by way of non-limiting example, without thereby departing from the scope of the present invention.

I claim:

1. A dual braking unit for pneumatic braking systems including, in series:
    a cylinder with a diaphragm (4, 11-17) for controlling the service braking, including an operating chamber (12) and an exhaust chamber (13) separated from each other by the diaphragm (11) and
    a cylinder with a drive spring (3, 6-10) for controlling the parking and emergency braking, including a chamber (7) for the spring and an operating chamber (8) separated by a piston (6, 10) with an operating tube or tubular push rod (10) which extends sealingly through a hole (5) in a wall (2) separating the operating chambers (8; 12) of the cylinders and cooperates with the diaphragm (11) of the cylinder for controlling the service braking,
    the end portion of the tube (10) which faces the diaphragm (11) having a closure element (30),
    comprising at least one pair of holes (35, 36; 135, 36; 35, 34) in the end portion of the tube (10) for enabling communication between the spring chamber (7) of the cylinder with the spring and the operating chamber (12) of the cylinder with the diaphragm when only the parking and emergency brake is applied; cut-off valve means (40-43) controlled by the pressure in the operating chamber (12) of the cylinder with the diaphragm being associated with the holes (35, 36; 135, 36; 34, 35) for preventing air from flowing from the operating chamber (12) of the cylinder with the diaphragm to the spring chamber (7) of the cylinder with the spring (9) when the service brakes are applied while the parking and emergency brake is applied.

2. A dual braking unit according to claim 1, wherein the cut-off valve means comprise a piston (40) slidable sealingly in the end of the tube (10) between a rest position (FIGS. 2 and 3) in which it bears sealingly against a portion of the wall of the tube (10) between the holes (35, 36; 35, 34) and a working position (FIG. 4) in which it bears sealingly against a portion of the wall of the tube (10) downstream of both the holes (35, 36), resilient means (42) being provided for urging the piston (40) of the cut-off valve means towards its rest position.

3. A dual braking unit according to claim 1 wherein both holes (35, 36) are formed in the end portion of the wall of the tube (10).

4. A dual braking unit according to claim 1, wherein one of the holes is formed in the wall of the end portion of the tube (10) while the other hole is constituted by a duct (34) defined between the end edge of that portion of the tube (10) and the associated closure element (30).

5. A dual braking unit according to claim 4, wherein the closure element is constituted by a plug (30) with a tubular portion (30a) engaged in the end portion of the tube (10) and carrying an external sealing ring (33; 133).

6. A dual braking unit according to claim 5, wherein the closure plug (30) has a lipped sealing ring (33) for preventing air from flowing from the operating chamber of the cylinder with the diaphragm to the interior of the tube (10).

7. A dual braking unit according to claim 5, wherein the closure plug (30) has a sealing ring (133, FIG. 7) of circular cross-section.

8. A dual braking unit according to claim 5, wherein the sealing ring carried by the closure element (30) bears against an end portion of the wall of the tube (10) upstream of both the holes (35, 36).

* * * * *